United States Patent
Bykov et al.

(10) Patent No.: US 11,321,671 B2
(45) Date of Patent: May 3, 2022

(54) JOB SKILL TAXONOMY

(71) Applicant: DHI GROUP, INC., New York, NY (US)

(72) Inventors: Yuri Bykov, Urbandale, IA (US);
Simon Hughes, Urbandale, IA (US);
David Fowler, Southampton (GB);
Hugh Krogh-Freeman, Urbandale, IA (US)

(73) Assignee: DHI GROUP INC., New York, NY (US)

( * ) Notice: Subject to any disclaimer, the term of this patent is extended or adjusted under 35 U.S.C. 154(b) by 240 days.

(21) Appl. No.: 16/551,798

(22) Filed: Aug. 27, 2019

(65) Prior Publication Data
US 2021/0065126 A1 Mar. 4, 2021

(51) Int. Cl.
*G06Q 10/00* (2012.01)
*G06Q 10/10* (2012.01)

(52) U.S. Cl.
CPC .............................. *G06Q 10/1053* (2013.01)

(58) Field of Classification Search
CPC ................................................ G06Q 10/1053
See application file for complete search history.

(56) References Cited

U.S. PATENT DOCUMENTS

| | | | |
|---|---|---|---|
| 7,761,320 B2* | 7/2010 | Fliess | G06Q 10/063112 705/7.14 |
| 10,565,561 B2* | 2/2020 | Goel | G06Q 50/01 |
| 2005/0080656 A1* | 4/2005 | Crow | G06Q 10/10 705/7.14 |
| 2007/0190504 A1* | 8/2007 | Schwartz | G09B 5/00 434/219 |
| 2015/0127567 A1* | 5/2015 | Menon | G06Q 10/1053 705/321 |
| 2015/0324333 A1* | 11/2015 | Squires | G06F 40/103 715/208 |
| 2017/0371957 A1* | 12/2017 | Merhav | G06Q 50/01 |
| 2018/0039946 A1* | 2/2018 | Bolte | G06Q 50/2057 |
| 2018/0121880 A1* | 5/2018 | Zhang | G06Q 10/1053 |
| 2018/0129192 A1* | 5/2018 | Murakami | G06Q 50/04 |
| 2018/0181544 A1* | 6/2018 | Zhang | G06N 3/0454 |

* cited by examiner

*Primary Examiner* — Gabrielle A McCormick
(74) *Attorney, Agent, or Firm* — F. Chau & Associates, LLC (57) ABSTRACT

Systems and methods for classifying job skills based on a job skill taxonomy built using artificial intelligence are described. The method may include identifying a set of job skill terms from a corpus of job description documents, generating a synonym file by associating each of the job skill terms with a canonical job skill, extracting a set of job skills from the corpus of job description documents using the synonym file, generating job skill relationship information based on the extracted set of job skills, and creating a job skill taxonomy based on the job skill relationship information, wherein the job skill taxonomy comprises a hierarchy of job skills.

18 Claims, 10 Drawing Sheets

JOB SKILL TAXONOMY

BACKGROUND

The following relates generally to classification of job skills, and more specifically to classifying job skills based on a job skill taxonomy built using artificial intelligence.

Matching job candidates with job postings is an important social and economic function in any society. Communication technologies such as the internet have changed the job matching process, and have become one of the most important ways for job candidates to find jobs. However, in many cases, the job skill descriptions of candidate resumes don't exactly match those of the job postings. This mismatch may occur even if the actual candidate skills are a good match for the position.

The result is that many openings go unfilled and many candidates go without jobs for substantial periods of time. Therefore, there is a need in the art for improved systems and methods for identifying job skills and matching job candidates with job postings.

SUMMARY

Systems and methods for classifying job skills based on a job skill taxonomy are described. The method may include identifying a set of job skill terms from a corpus of job description documents, generating a synonym file (i.e., standardized job skill terminology) by associating each of the job skill terms with a canonical job skill, extracting a set of job skills from the corpus of job description documents using the synonym file, generating job skill relationship information based on the extracted set of job skills, and creating a job skill taxonomy based on the job skill relationship information, wherein the job skill taxonomy comprises a hierarchy of job skills. The standardized job skill terminology and taxonomy can be used to provide customized career trajectory recommendations and job skill trend information, as well as provide improved matching between job candidates and job openings.

DETAILED DESCRIPTION

The present disclosure relates generally to classification of job skills, and more specifically to classifying job skills based on a job skill taxonomy built using artificial intelligence.

Communication technologies such as the internet have changed the job matching process, and have become one of the most important ways for job candidates to find jobs. However, in many cases, the job skill descriptions of candidate resumes don't exactly match those of the job postings. This mismatch may occur even if the actual candidate skills are a good match for the position. A result is that many openings go unfilled and many candidates go without jobs for substantial periods of time. Therefore, embodiments of the present disclosure describe systems and methods for identifying job skills and matching job candidates with job postings.

Specifically, at least one embodiment of the present disclosure identifies a set of job skill terms from a corpus of job description documents, generates a synonym file by associating each of the job skill terms with a canonical job skill, extracts a set of job skills from the corpus of job description documents using the synonym file, generates job skill relationship information based on the extracted set of job skills, and creates a job skill taxonomy based on the job skill relationship information, wherein the job skill taxonomy comprises a hierarchy of job skills.

After the job skill taxonomy is created, it is used to match job candidates with job postings, provide career development recommendations, provide salary predictions, and other tasks related to the job market. Some embodiments of the present disclosure relate particularly to job matching within the technology job fields.

By using a job skill taxonomy for job matching (and salary prediction, career recommendations, etc.) the job matching service identifies relationships among skills that are not worded exactly alike, but are related. This enables smart recommendations that aren't limited by slight mismatches in skills or wording. As a result, a system based on the job skill taxonomy described herein improves the effectiveness of the matches and recommendations, which may reduce the time that job postings stay open.

In one embodiment, the job skills taxonomy described herein represents a specialized tech domain taxonomy that contains metadata about tech skills, their semantic relationships, trend data, hierarchical information, and so on. It may combine statistically derived data elements and patterns with vetting and validation by human experts.

In embodiments of the present disclosure, a job posting system recognizes different variants of job skills, and collapses them into a canonical standard. Thus, the taxonomy can be leveraged for fast extraction and standardization of job-related terminology. In some examples, the job skills taxonomy may draw from millions of documents and may be based on the application of deep artificial neural network algorithms and other statistical and probabilistic ML models. This enables a "long-tail" of personalized relevant experience for users of a job posting platform.

Figure 1:
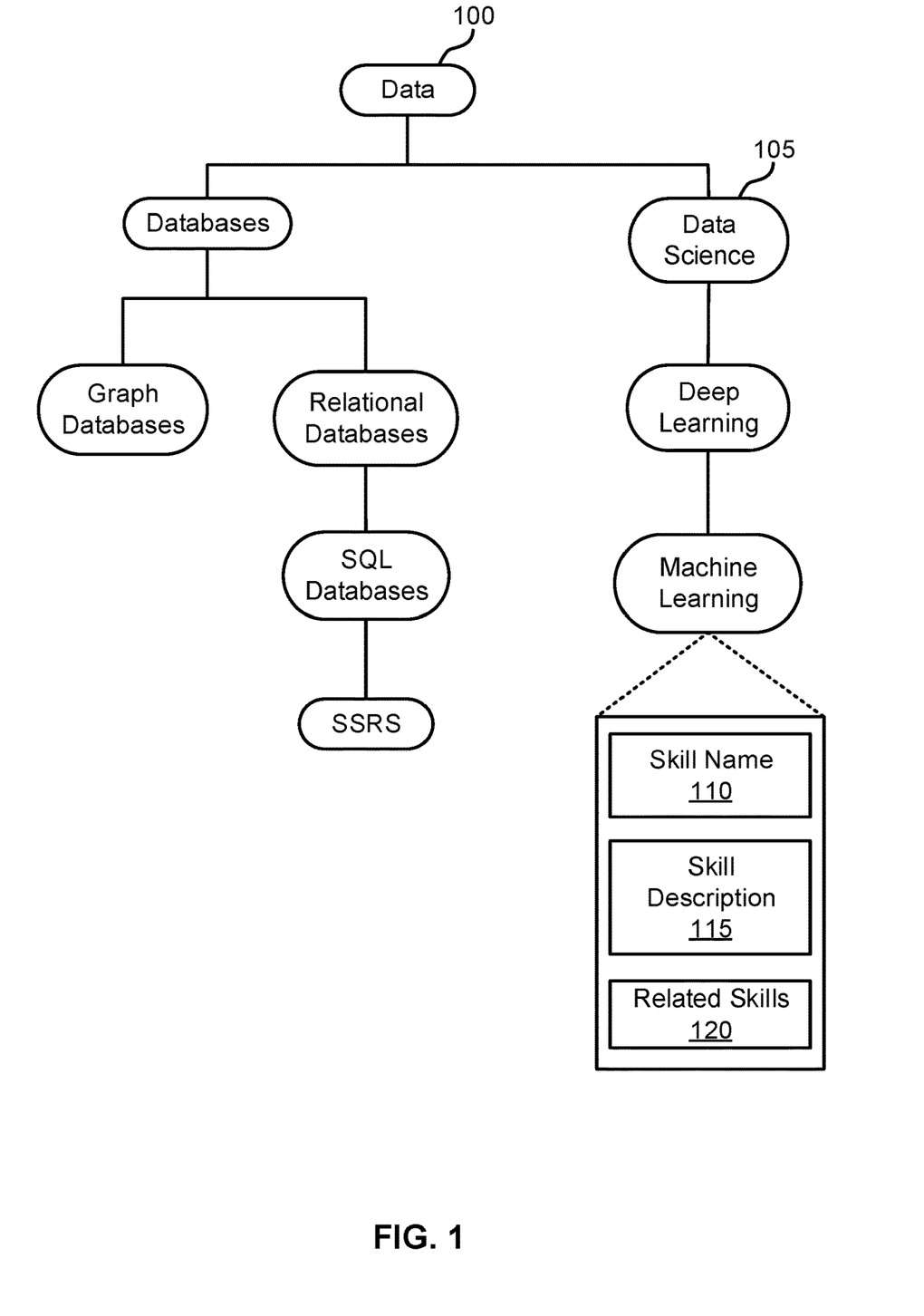
FIG. 1 shows an example of a job skill taxonomy in accordance with aspects of the present disclosure.

FIG. 1 shows an example of a job skill taxonomy in accordance with aspects of the present disclosure. Specifically, FIG. 1 shows a job tree forming a portion of a job skill taxonomy within a technology field related to data science. This particular skills tree is just an example, and the job skill taxonomy described within the present disclosure may relate to any career field.

The tree shown in FIG. 1 shows a logical set of relationships including parent skills 100 and child skills 105. In some cases, as illustrated, a child skill 100 may be a parent to other nodes (i.e., other child skills 100), forming a hierarchical set of relationships. Thus, parent skills such as parent skill 100 may include one or more child skills 105.

Parent skills 100 and child skills 105 may each include a skill name 110, a skill description 115, and a number of related skills 120.

Figure 2:
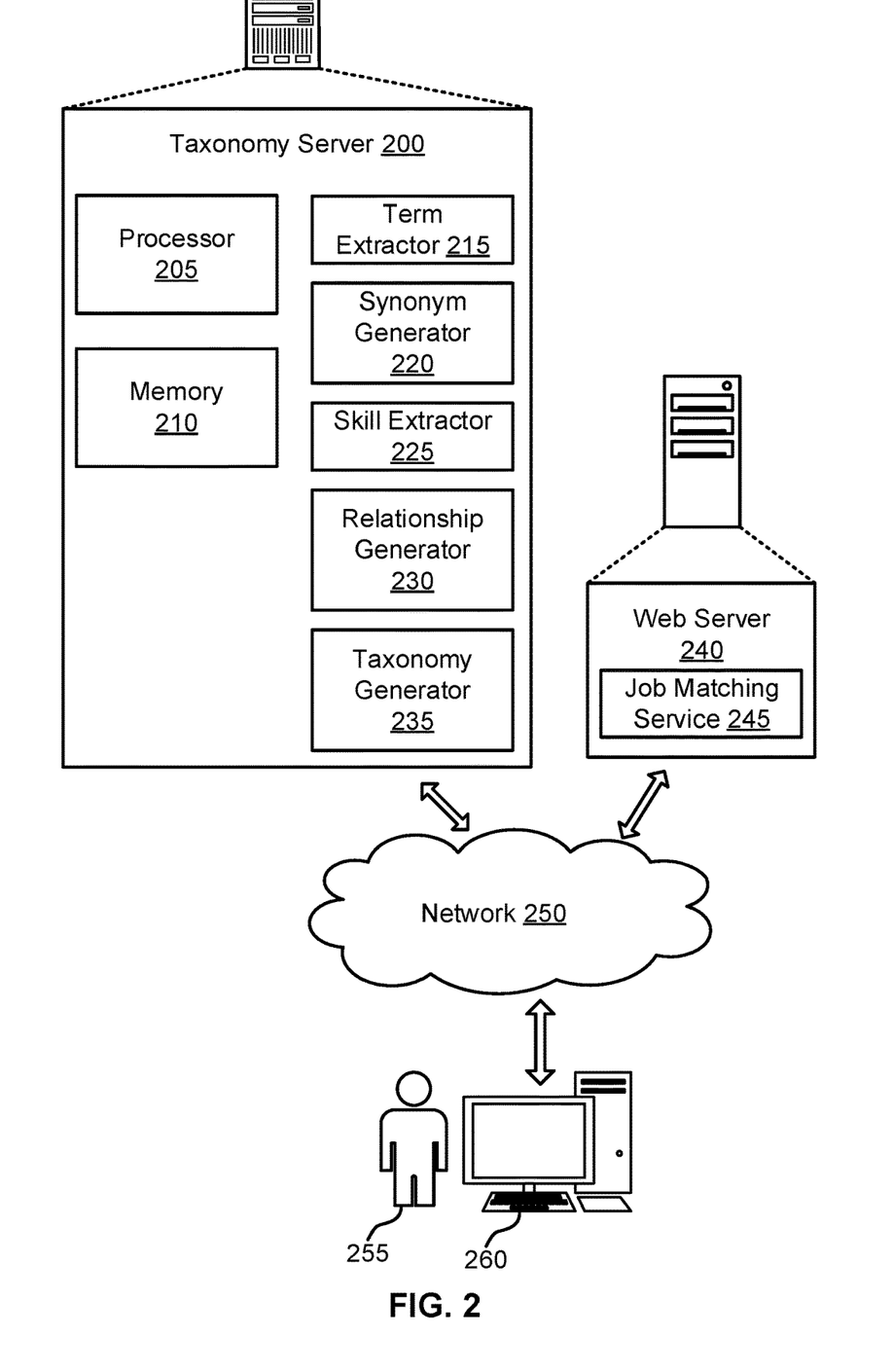
FIG. 2 shows an example of a job matching system in accordance with aspects of the present disclosure.

FIG. 2 shows an example of a job matching system in accordance with aspects of the present disclosure. The example shown includes taxonomy server 200, web server 240, network 250, user 255, and user terminal 260.

Taxonomy server 200 includes processor 205, memory 210, term extractor 215, synonym generator 220, skill extractor 225, relationship generator 230, and taxonomy generator 235. In some examples, one or more of these components may be supervised or supplemented by a human curator.

A processor 205 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions.

Memory 210 may include random access memory (RAM), read-only memory (ROM), or a hard disk. The memory may be solid state or a hard disk drive, and may store computer-readable, computer-executable software including instructions that, when executed, cause a processor to perform various functions described herein. In some cases, the memory 210 may contain, among other things, a BIOS which may control basic hardware or software operation such as the interaction with peripheral components or devices. In some cases, a memory controller may operate memory cells as described herein. In some cases, memory controller includes a row decoder, column decoder, or both. In some cases, memory cells within a memory may store information in the form of a logical state.

Term extractor 215 identifies a set of job skill terms from a corpus of job description documents. Synonym generator 220 may generate a synonym file by associating each of the job skill terms with a canonical job skill.

Skill extractor 225 extracts a set of job skills from the corpus of job description documents using the synonym file. In various embodiments, skill extractor 225 may utilize a custom extraction platform or enterprise search platform (e.g., Apache Solr). Such a platform may offer capabilities such as full-text search, hit highlighting, faceted search, real-time indexing, dynamic clustering, database integration, database compatibility (including SQL and NoSQL databases) and rich document (e.g., MS Word and PDF) handling.

Relationship generator 230 generates job skill relationship information based on the extracted set of job skills. In one example, relationship generator 230 utilizes latent semantic analysis (LSA). LSA is a natural language processing (NLP) technique for analyzing relationships between documents and the terms within the documents. For example, an LSA-based system may be based on the assumption that words that are close in meaning will occur close to each other, or in similar documents (i.e., documents containing similar sets of terms).

In some cases, matrices containing word counts may be generated from the documents. The matrices may then be processed using singular value decomposition (SVD) to reduce the number of matrix rows while preserving structure among columns. The documents may then be compared by taking the cosine of the angle between the two vectors (or the dot product between the normalizations of the two vectors) formed by any two columns. Values close to 1 represent similar documents and values close to 0 represent documents with little similarity.

In another example, Word2Vec model may be used as an alternative to LSA. In some cases, the Word2Vec model may comprise a two-layer neural network trained to reconstruct the context of terms in a document. A Word2Vec model takes a corpus of documents as input and produces a vector space as output. The resulting vector space may comprise hundreds of dimensions, with each term in the corpus assigned a corresponding vector in the space. The distance between the vectors may be compared using the cosine method similar to the case with LSA. Word vectors that share a common context in the corpus will be located close to each other in the vector space.

Taxonomy generator 235 creates a job skill taxonomy based on the job skill relationship information, wherein the job skill taxonomy comprises a hierarchy of job skills. In some examples, the job skill taxonomy comprises a plurality of job skills, wherein each of the job skills is associated with a skill name, a skill description, and one or more related skills.

Web server 240 includes job matching service 245. Job matching service 245 may identify profile information for a job candidate. Job matching service 245 may also generate a salary prediction based on the profile information and the job skill taxonomy. Job matching service 245 may also identify profile information for a job candidate. Job matching service 245 may also generate a career trajectory recommendation for the job candidate based on the profile information and the job skill taxonomy. For example, the career trajectory may include one or more job categories that progress in terms of seniority, pay scale, etc. and that include skills relevant to the profile information of the job candidate based on the job taxonomy.

Job matching service 245 may also identify profile information for a job candidate. Job matching service 245 may also identify a plurality of job postings, wherein each of the plurality of job postings comprises a job description. Job matching service 245 may also score each of the plurality of job postings based on the profile information, the corresponding job description, and the job skill taxonomy. Job matching service 245 may also present one or more of the plurality of job postings to the job candidate based on the scoring.

Job matching service 245 may also identify a job description for a job posting. Job matching service 245 may also identify a plurality of candidate resumes. Job matching service 245 may also score each of the plurality of candidate resumes based on the job description and the job skill taxonomy. Job matching service 245 may also present one or more of the candidate resumes based on the scoring.

Job matching service 245 may also receive a plurality of resumes from a job matching service, wherein the corpus of job description documents comprises the plurality of resumes. Job matching service 245 may also receive a plurality of job descriptions from a job matching service 245, wherein the corpus of job description documents comprises the plurality of job descriptions.

In some examples, one or more of the components of the taxonomy server 200 includes a machine learning model in the form of an artificial neural network (ANN). For example, an ANN may be used to perform one or more functions of the relationship generator 230. An ANN may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal can process it and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Figure 3:
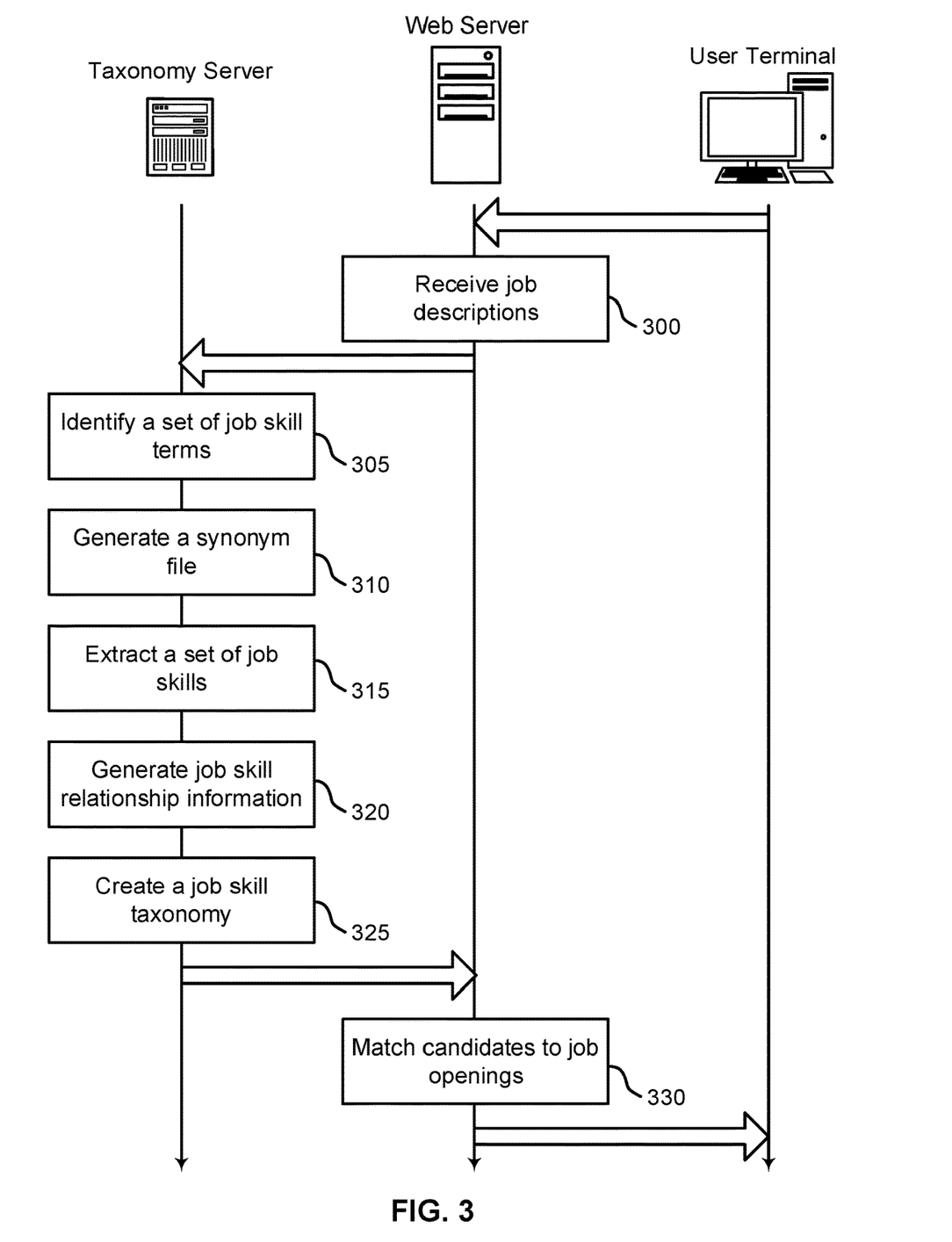
FIGS. 3 through 7 show examples of a process for classifying job skills based on a job skill taxonomy built using artificial intelligence in accordance with aspects of the present disclosure.

FIG. 3 shows an example of a process for classifying job skills based on a job skill taxonomy built using artificial intelligence in accordance with aspects of the present disclosure. In some examples, these operations may be performed by one or more processors executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 300, the system (i.e., including taxonomy server 200, web server 240, network 250, and user terminal 260) may receive job descriptions. In some cases, the operations of this step may refer to, or be performed by, a job matching service as described with reference to FIG. 2.

At step 305, the system may identify a set of job skill terms. In some cases, the operations of this step may refer to, or be performed by, a term extractor as described with reference to FIG. 2.

At step 310, the system may generate a synonym file. In some cases, the operations of this step may refer to, or be performed by, a synonym generator as described with reference to FIG. 2.

At step 315, the system may extract a set of job skills. In some cases, the operations of this step may refer to, or be performed by, a skill extractor as described with reference to FIG. 2.

At step 320, the system may generate job skill relationship information. In some cases, the operations of this step may refer to, or be performed by, a relationship generator as described with reference to FIG. 2.

At step 325, the system may create a job skill taxonomy. In some cases, the operations of this step may refer to, or be performed by, a taxonomy generator as described with reference to FIG. 2.

At step 330, the system may match candidates to job postings.

Figure 4:
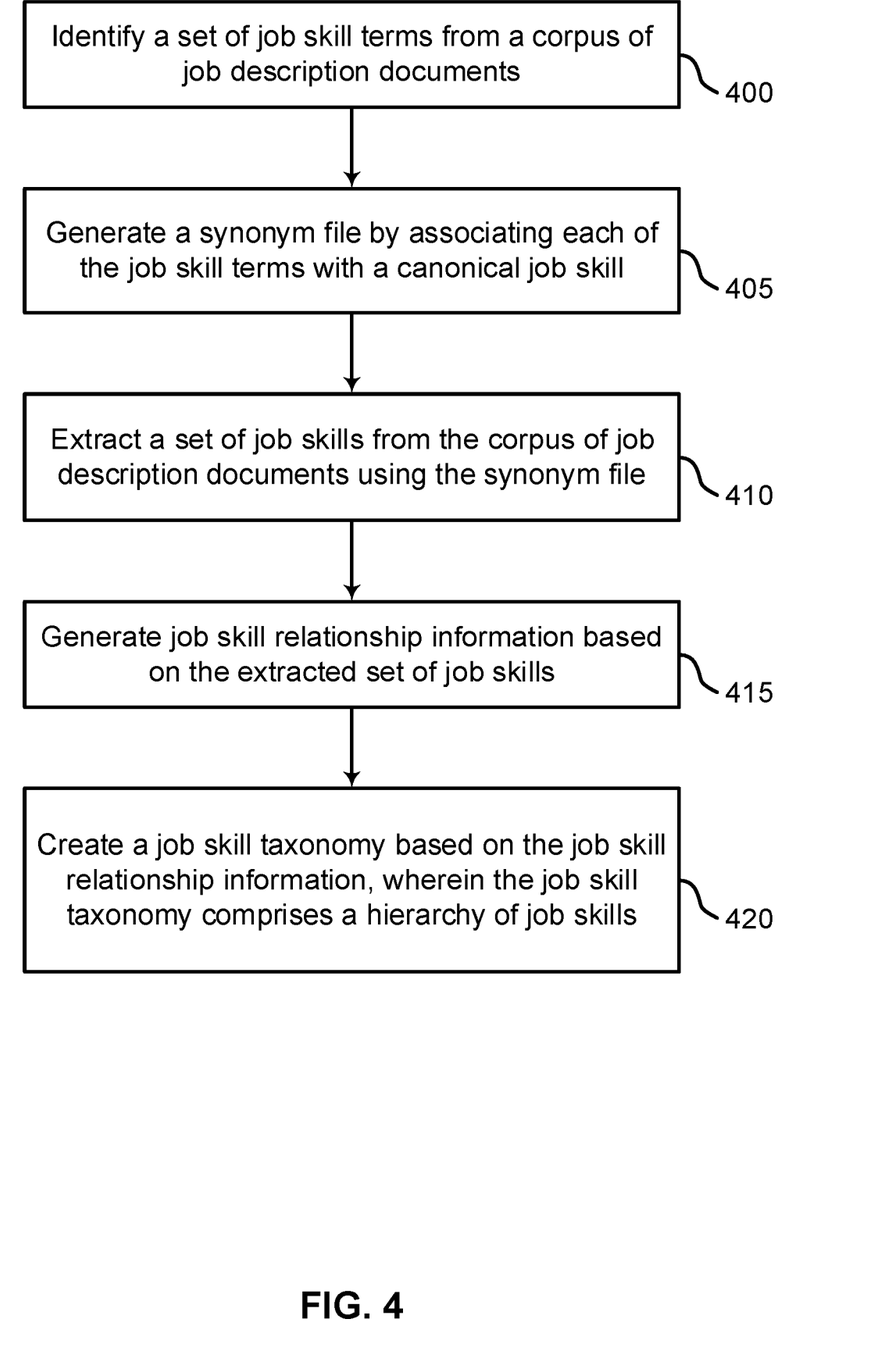

FIG. 4 shows an example of a process for classifying job skills based on a job skill taxonomy built using artificial intelligence in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 400, the system may identify a set of job skill terms from a corpus of job description documents. In some cases, the operations of this step may refer to, or be performed by, a term extractor as described with reference to FIG. 2. Further detail regarding identifying a set of job skill terms is described with reference to FIG. 8.

In some embodiments, the corpus of job description documents may include resumes and job postings collected from a job board. These documents may include unstructured text that may be analyzed to identity terms related to particular job skills or technologies.

In various embodiments, the job skill terms may be identified with an information extraction technique include regular expressions, Bayes classifiers, maximum entropy models, multinomial logistic regression, recurrent neural networks, Hidden Markov models, conditional Markov models, conditional random fields, or any other suitable information extraction system.

At step 405, the system may generate a synonym file by associating each of the job skill terms with a canonical job skill. In some cases, the operations of this step may refer to, or be performed by, a synonym generator as described with reference to FIG. 2. In some examples, the synonym file may comprise a controlled vocabulary, which may be generated according to the process described below with reference to FIG. 8.

In some examples, synonyms may be generated automatically, manually, or using a combination of automatic and manual methods. Automatic synonyms may be generated by associating each word or term with a vector, and then assigning vectors that are sufficiently close (measured by distance in the vector space) as synonyms. For example, the Word2Vec model may be used to embed words in a vector space. In some cases, a predetermined thesaurus is used to generate the synonym file. In some examples, a rough word matrix may be transformed using a singular value decomposition method.

At step 410, the system may extract a set of job skills from the corpus of job description documents using the synonym file. In some cases, the operations of this step may refer to, or be performed by, a skill extractor as described with reference to FIG. 2. For example, each term in a document may be compared to the synonym file. If the term, or a variation on the term, is located in the synonym file a canonical form of the term may be associated with the document.

At step 415, the system may generate job skill relationship information based on the extracted set of job skills. In some cases, the operations of this step may refer to, or be performed by, a relationship generator as described with reference to FIG. 2.

Job skill relationship information may be generated using a machine learning model, by analyzing the proximity of canonical terms within documents, or a combination thereof.

For example, proximity in the meaning of words may be determined using an embedding of the skills in a word vector space (i.e., Word2Vec). Additionally, or alternatively, skills that commonly appear together on resumes and job postings may be taken to have a relationship. In some examples, the probabilities that words appear together may be asymmetric. For example, given word A and word B, P(A|B) may not equal P(B|A). The relationship between the words may be inferred based on the magnitude and relationship among the conditional probabilities.

At step 420, the system may create a job skill taxonomy based on the job skill relationship information, wherein the job skill taxonomy comprises a hierarchy of job skills. In some cases, the operations of this step may refer to, or be performed by, a taxonomy generator as described with reference to FIG. 2. An example job skill taxonomy is described with reference to FIG. 1. Further detail regarding creating the job skill taxonomy may comprise a semantic network of skills as described below with reference to FIG. 9.

Figure 5:
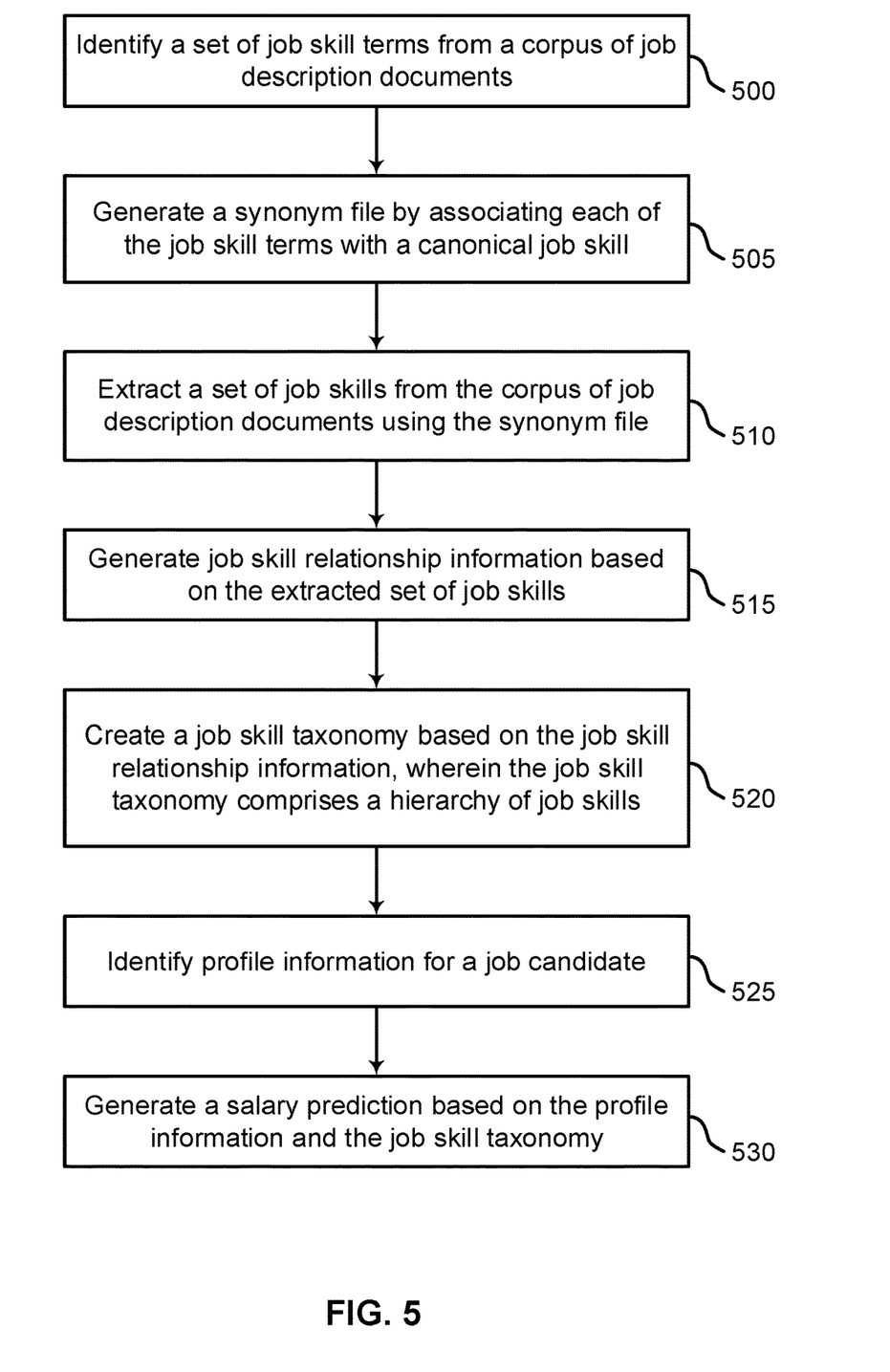

FIG. 5 shows an example of a process for classifying job skills based on a job skill taxonomy built using artificial intelligence in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 500, the system may identify a set of job skill terms from a corpus of job description documents. In some cases, the operations of this step may refer to, or be performed by, a term extractor as described with reference to FIG. 2.

At step 505, the system may generate a synonym file by associating each of the job skill terms with a canonical job skill. In some cases, the operations of this step may refer to, or be performed by, a synonym generator as described with reference to FIG. 2.

At step 510, the system may extract a set of job skills from the corpus of job description documents using the synonym file. In some cases, the operations of this step may refer to, or be performed by, a skill extractor as described with reference to FIG. 2.

At step 515, the system may generate job skill relationship information based on the extracted set of job skills. In some cases, the operations of this step may refer to, or be performed by, a relationship generator as described with reference to FIG. 2.

At step 520, the system may create a job skill taxonomy based on the job skill relationship information, wherein the job skill taxonomy comprises a hierarchy of job skills. In some cases, the operations of this step may refer to, or be performed by, a taxonomy generator as described with reference to FIG. 2.

At step 525, the system may identify profile information for a job candidate. In some cases, the operations of this step may refer to, or be performed by, a job matching service as described with reference to FIG. 2. For example, the profile information may be gathered from a resume or job application submitted by the job candidate on a job board.

At step 530, the system may generate a salary prediction, or a career recommendation based on the profile information and the job skill taxonomy. In some cases, the operations of this step may refer to, or be performed by, a job matching service as described with reference to FIG. 2.

In one example, the profile information of the candidate may be compared to a set of job skills that are commonly associated with one or more identified positions. The positions themselves may be selected based on the profile information, as well as other information such as a salary range. Thus, jobs that a candidate may not have considered, but which overlap with the candidate's skill set, may be identified. Then, any job skills associated with the position that the candidate does not have may be presented to the candidate as recommendations.

In some examples, a plurality of job positions may be presented to the candidate as a recommended career path, with each position representing an increasing level of experience, skill and salary.

Figure 6:
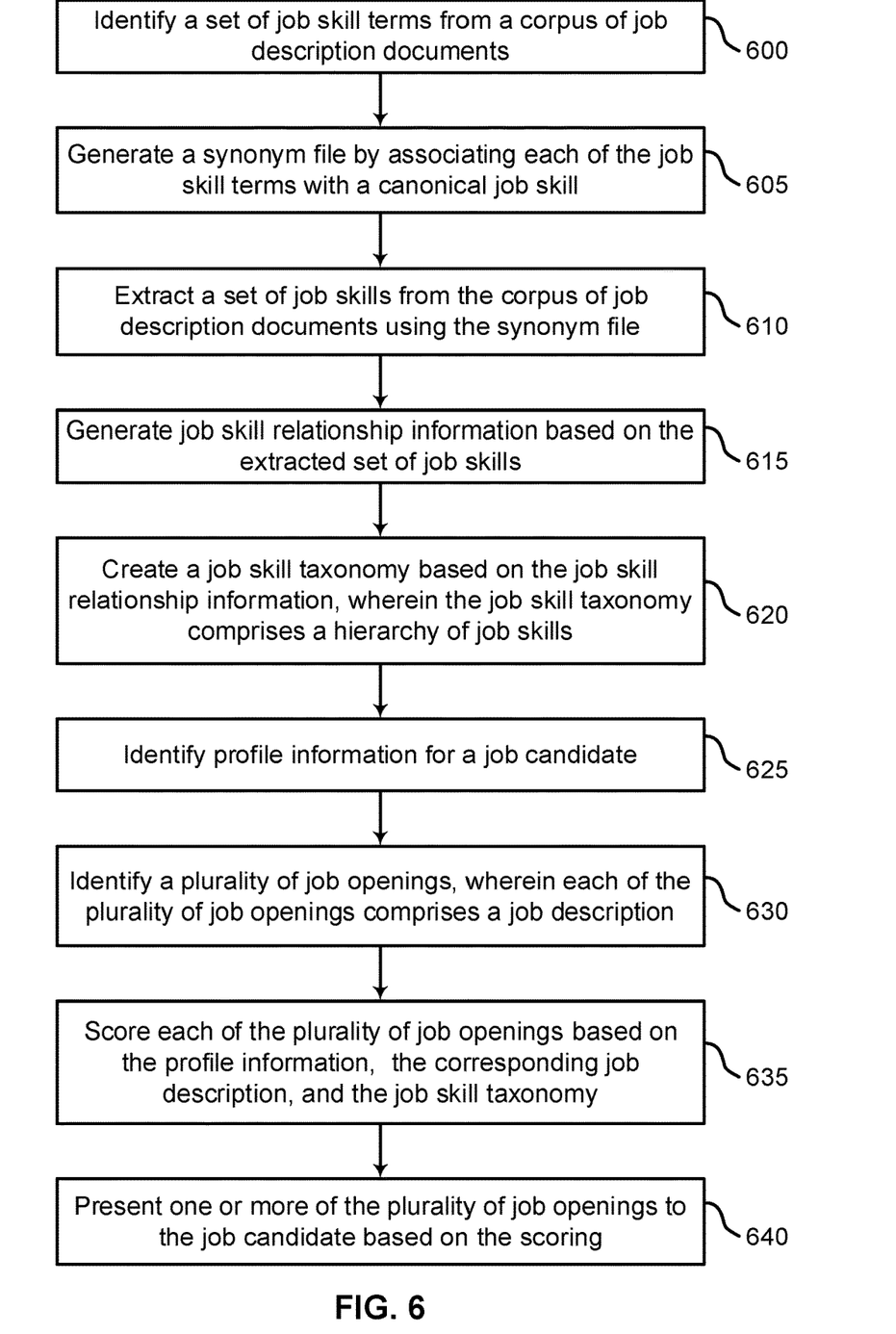

FIG. 6 shows an example of a process for classifying job skills based on a job skill taxonomy built using artificial intelligence in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 600, the system may identify a set of job skill terms from a corpus of job description documents. In some cases, the operations of this step may refer to, or be performed by, a term extractor as described with reference to FIG. 2.

At step 605, the system may generate a synonym file by associating each of the job skill terms with a canonical job skill. In some cases, the operations of this step may refer to, or be performed by, a synonym generator as described with reference to FIG. 2.

At step 610, the system may extract a set of job skills from the corpus of job description documents using the synonym file. In some cases, the operations of this step may refer to, or be performed by, a skill extractor as described with reference to FIG. 2.

At step 615, the system may generate job skill relationship information based on the extracted set of job skills. In some cases, the operations of this step may refer to, or be performed by, a relationship generator as described with reference to FIG. 2.

At step 620, the system may create a job skill taxonomy based on the job skill relationship information, wherein the job skill taxonomy comprises a hierarchy of job skills. In some cases, the operations of this step may refer to, or be performed by, a taxonomy generator as described with reference to FIG. 2.

At step 625, the system may identify profile information for a job candidate. In some cases, the operations of this step may refer to, or be performed by, a job matching service as described with reference to FIG. 2.

At step 630, the system may identify a plurality of job postings, wherein each of the plurality of job postings comprises a job description. In some cases, the operations of this step may refer to, or be performed by, a job matching service as described with reference to FIG. 2.

At step 635, the system may score each of the plurality of job postings based on the profile information, the corresponding job description, and the job skill taxonomy. In some cases, the operations of this step may refer to, or be performed by, a job matching service as described with reference to FIG. 2. For example, the job postings may be ranked based on how qualified the candidate is for the position, the expected salary, or a combination thereof.

At step 640, the system may present one or more of the plurality of job postings to the job candidate based on the scoring. In some cases, the operations of this step may refer to, or be performed by, a job matching service as described with reference to FIG. 2.

Figure 7:
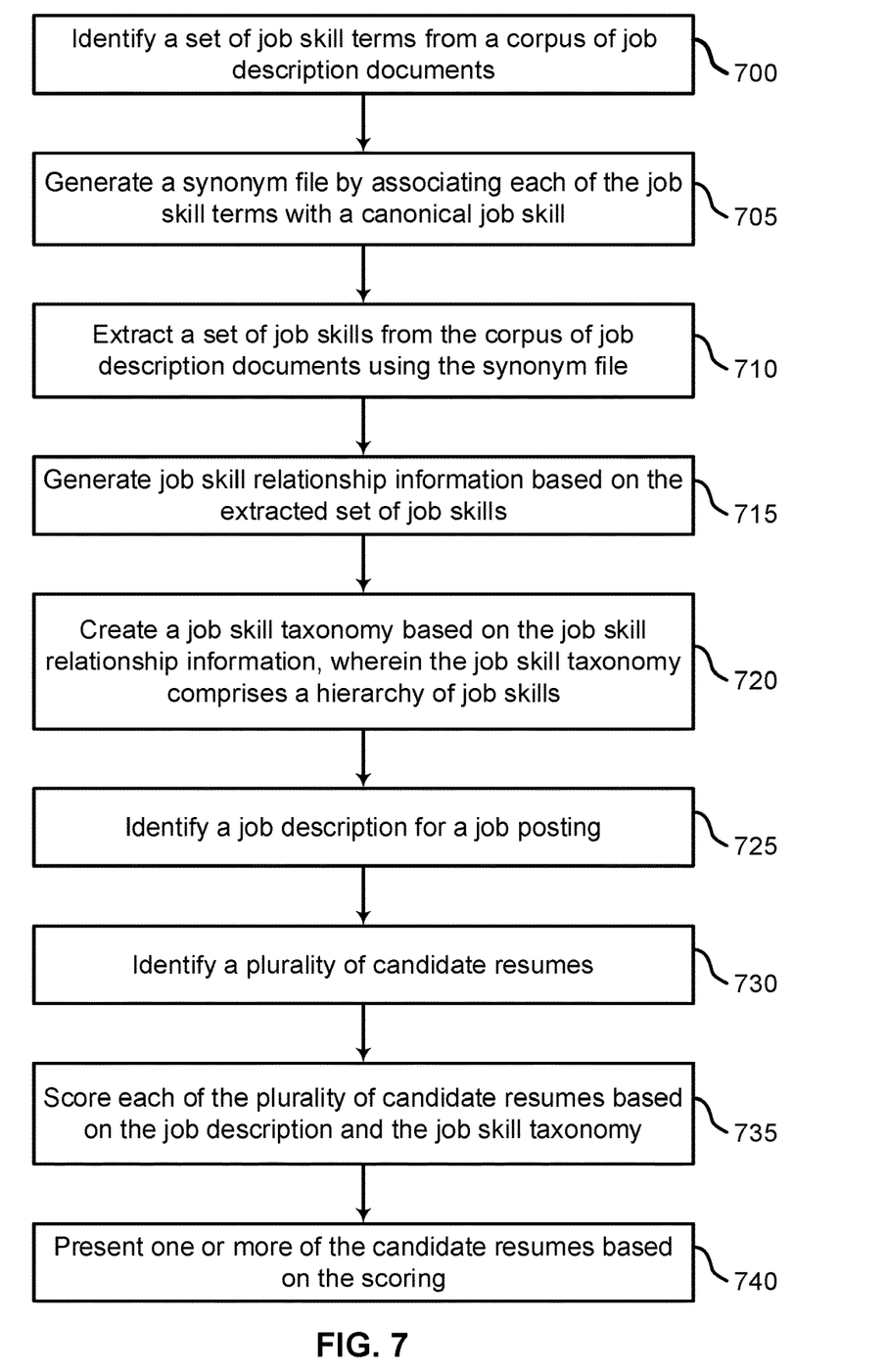

FIG. 7 shows an example of a process for classifying job skills based on a job skill taxonomy built using artificial intelligence in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 700, the system may identify a set of job skill terms from a corpus of job description documents. In some cases, the operations of this step may refer to, or be performed by, a term extractor as described with reference to FIG. 2.

At step 705, the system may generate a synonym file by associating each of the job skill terms with a canonical job skill. In some cases, the operations of this step may refer to, or be performed by, a synonym generator as described with reference to FIG. 2.

At step 710, the system may extract a set of job skills from the corpus of job description documents using the synonym file. In some cases, the operations of this step may refer to, or be performed by, a skill extractor as described with reference to FIG. 2.

At step 715, the system may generate job skill relationship information based on the extracted set of job skills. In some cases, the operations of this step may refer to, or be performed by, a relationship generator as described with reference to FIG. 2.

At step 720, the system may create a job skill taxonomy based on the job skill relationship information, wherein the job skill taxonomy comprises a hierarchy of job skills. In some cases, the operations of this step may refer to, or be performed by, a taxonomy generator as described with reference to FIG. 2.

At step 725, the system may identify a job description for a job posting. In some cases, the operations of this step may refer to, or be performed by, a job matching service as described with reference to FIG. 2.

At step 730, the system may identify a plurality of candidate resumes. In some cases, the operations of this step may refer to, or be performed by, a job matching service as described with reference to FIG. 2.

At step 735, the system may score each of the plurality of candidate resumes based on the job description and the job skill taxonomy. In some cases, the operations of this step may refer to, or be performed by, a job matching service as described with reference to FIG. 2. For example, the candidates (or candidate resumes) may be ranked based on how well the skills match the skills in the job description. In some cases, other factors may be taken into account such as years of experience, the validity of the experience, or any combination thereof.

At step 740, the system may present one or more of the candidate resumes based on the scoring. In some cases, the operations of this step may refer to, or be performed by, a job matching service as described with reference to FIG. 2.

Figure 8:
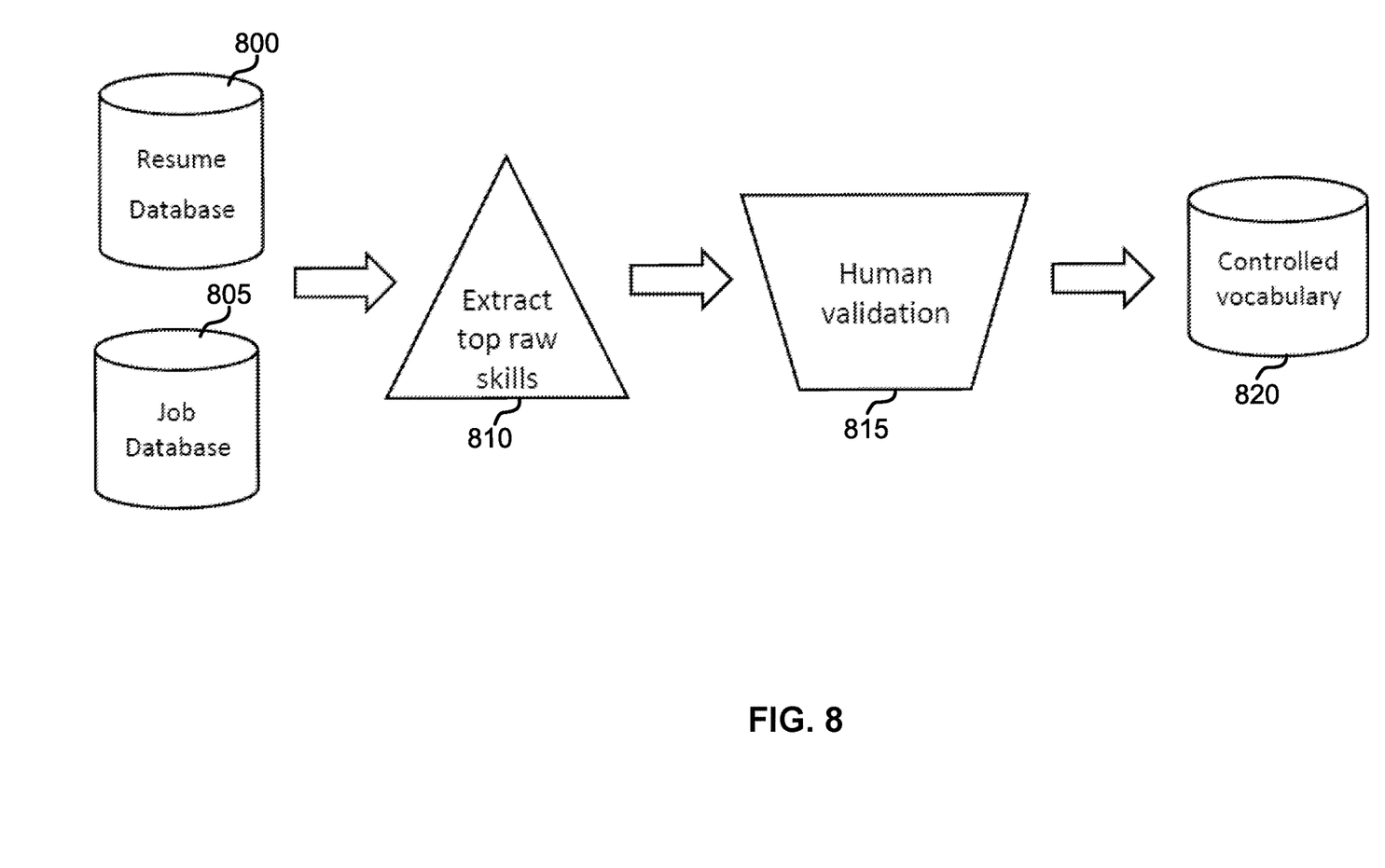
FIG. 8 shows an example of a process for identifying a controlled vocabulary in accordance with aspects of the present disclosure.

FIG. 8 shows an example of a process for identifying a controlled vocabulary in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 800, the system may identify a database of resumes. At step 805, the system may identify a database of job postings.

At step 810, the system may extract raw skills from the database of resumes and the database of job postings. For the initial construction of the controlled vocabulary, (i.e., the data dictionary that maps skill variants to their canonical forms), databases of candidate resumes and job postings may be used to identify the most frequent terms encountered in free-form fields dedicated to storing skills data.

At step 815, the system may validate the extracted raw skills. Once the raw skills are extracted, they may be validated using an automated algorithm, human validation, or both. For example, extraction may be followed by manual review, vetting and validation by human domain experts. As part of that process, descriptions for skills may also be added. The process may be repeated regularly to incrementally add new emergent skills and their variants. Quality assurance checks may also be applied, such as idempotency detection, to ensure additions to the taxonomy do not create bugs and other issues. Rules for identifying job skills may also be generated.

As an example of the job skills validation, it may be verified that: 1) The rules or skills don't conflict with later rules as applied in sequence as an earlier rule, 2) Idempotency—the skills and titles output map to the same entity when ran through it once more, 3) There aren't duplicate entries, 4) Conflicting rules that map the same string or substring to two or more different entities, 5) Swapping the order of words doesn't break the mapping except where desired, and 6) Individual items don't map to multiple entities.

At step 820, the system may generate a controlled job skill vocabulary based on the validated raw skills (and/or the associated rules).

Figure 9:
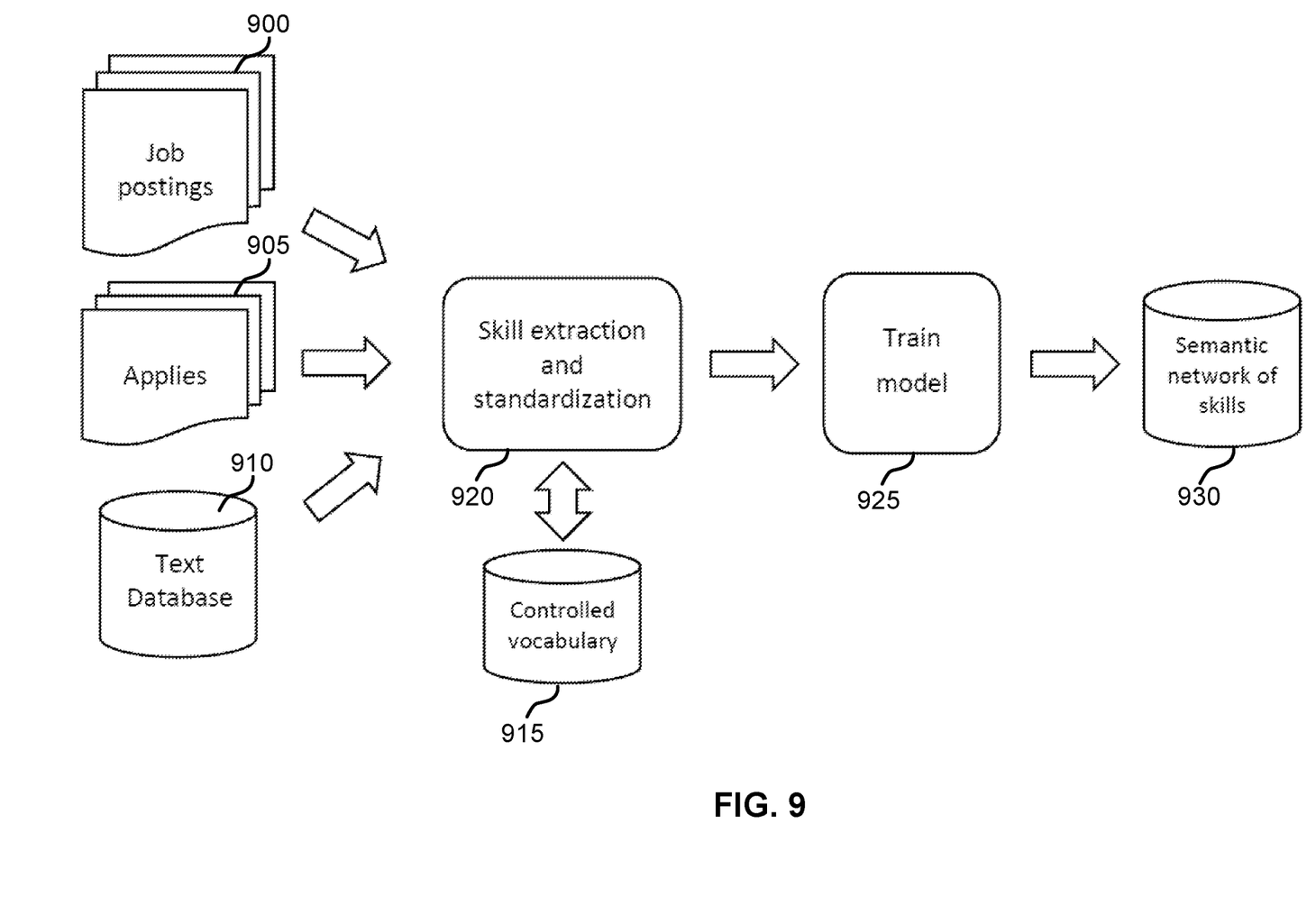
FIG. 9 shows an example of a process for computing semantic relations between job skills in accordance with aspects of the present disclosure.

FIG. 9 shows an example of a process for computing semantic relations between job skills in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 900, the system may identify a set of job postings. At step 905, the system may identify a set of job applications. At step 910, the system may identify a text description database (i.e., Wikipedia or DBPedia). In other words, extract skills from job postings, text database, and job applications, and standardize them to their canonical forms.

At step 915, the system may identify a controlled vocabulary of job skills. At step 920, the system may extract standardized skills from the job postings, the job applications, the text description database based on the controlled vocabulary of job skills.

In one embodiment, analysis chains may be used to progressively process text. As an example, a job skill analysis chain includes the steps: parse html, clean the string (i.e., collapse multiple spaces), surround alphanumeric characters with spaces, tokenize the string, identify skill variants and wrap them in tags i.e. <skill>EXAMPLE JOB SKILL</skill>), identify case sensitive skill variants, remove non-skill terms, remove skills tags, standardize skill variants, and remove empty tokens.

At step 925, the system may train a machine learning model based on the extracted standardized skills. In other words, once a clean list of extracted skills is available, apply an algorithm that ranks skill pairs in order of their semantic relatedness to each other.

In one embodiment, the algorithm may be a learning-to-rank algorithm based on LambdaRank, which is in turn based on RankNet. A distributed gradient boosting library such as XGBoost may be used to implement the algorithm.

Some embodiments also utilize the algorithm Word2Vec, a deep learning model that learns continuous vector representations of words, known as "word embeddings". Multiple features may serve as the input to the training algorithm. Some of these features may measure string similarity (e.g., Jaccard, Sorensen-Dice, Token set ratio, etc.) while others measure semantic or probabilistic relatedness (e.g., Word2Vec, Latent Semantic Analysis, PMI).

The features input to the training algorithm may include: cosine similarity, applied to Word2Vec vectors, trained with job postings; Earth Mover's Distance, applied to Word2Vec vectors, trained with job postings; pointwise mutual information (PMI) calculated from application data, specifically the skills common to the applicant's profile and the job posting; a Jaccard index, applied to search and related skills; the Sorensen-Dice coefficient, applied to search and related skills; a Token set ratio, applied to search and related skills; a joint probability of search and related skills, trained from job postings; a prior probability of search and related skills, trained from job postings; PMI of search and related skills, trained from job postings; cosine similarity, applied to Word2Vec vectors, trained using database data; Latent Semantic Analysis (LSA), applied to job postings; LSA, applied to job postings, using the job titles as documents; LSA, applied to job postings, using the job titles as documents, binary version; joint probability of search and related skills, trained from database data; prior probability of search and related skills, trained from database data; PMI of search and related skills, trained from database data; and character lengths of search and related skills.

At step 930, the system may create a semantic job skill network based on the machine learning model. In one example, the machine learning model outputs a file that consists of skill pairs sorted by a ranking score. The semantic job skill network (i.e., the taxonomy) may correspond to, or may be generated based on this output file.

In some embodiments, the machine learning model may enable the system to perform intelligent contextual parsing, for example, recognizing required versus preferred skills, reducing false positives, disambiguating equivocal terms, and so on.

Figure 10:
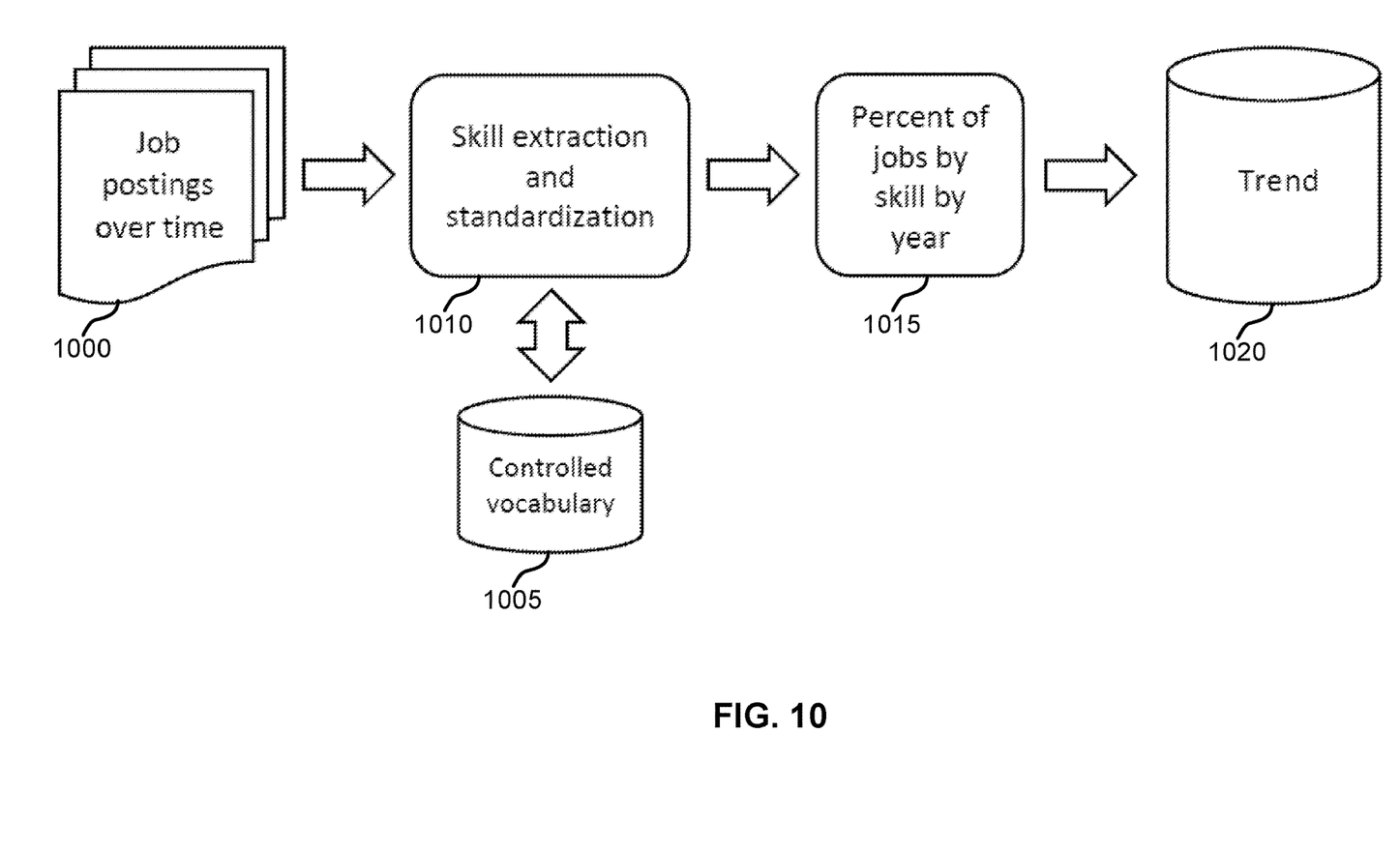
FIG. 10 shows an example of a process for calculating a trend in job skills in accordance with aspects of the present disclosure.

FIG. 10 shows an example of a process for calculating a trend in job skills in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 1000, the system may identify a set of job postings, where each of the set of job postings is associated with a time stamp. At step 1005, the system may identify a controlled vocabulary of job skills. At step 1010, the system may extract standardized skills from the set of job postings based on the controlled vocabulary of job skills (as described above with reference to FIGS. 8 and 9).

At step 1015, the system may calculate a percent of jobs having each of the job skills across each of a set of years. At step 1020, the system may generate a smooth trend function based on the percent of jobs having each of the job skills across the set of years.

In other words, the process computes yearly trend for each skill by looking at the percent of job postings containing a specified skill to account for variations in total job postings over time. Then a smooth trend (e.g., based on 4-degree polynomial smoothing) may be used to regularize wild swings for infrequent skills where there may not be enough data.

Thus, a method, apparatus, and non-transitory computer readable medium for classifying job skills based on a job skill taxonomy built using artificial intelligence is described. The method, apparatus, and non-transitory computer readable medium may provide for identifying a set of job skill terms from a corpus of job description documents, generating a synonym file by associating each of the job skill terms with a canonical job skill, extracting a set of job skills from the corpus of job description documents using the synonym file, generating job skill relationship information based on the extracted set of job skills, and creating a job skill taxonomy based on the job skill relationship information, wherein the job skill taxonomy comprises a hierarchy of job skills.

Another method, apparatus, and non-transitory computer readable medium for classifying job skills is described. The method, apparatus, and non-transitory computer readable medium may provide for identifying a database of resumes, a set of job postings, or both; extracting raw skills from the set of resumes, the set of job postings, or both; validating the extracted raw skills; and generating a controlled job skill vocabulary based on the validated raw skills.

Another method, apparatus, and non-transitory computer readable medium for classifying job skills based on a job skill taxonomy built using artificial intelligence is described. The method, apparatus, and non-transitory computer readable medium may provide for identify a set of job postings, job applications, or a text description database; identifying a controlled vocabulary of job skills; extracting standardized skills from the job postings, the job applications, the text description database based on the controlled vocabulary of job skills; train a machine learning model based on the extracted standardized skills; and create a semantic job skill network based on the machine learning model.

Another method, apparatus, and non-transitory computer readable medium for identifying job skill trends is described. The method, apparatus, and non-transitory computer readable medium may provide for identifying a set of job postings, wherein each of the set of job postings is associated with a time stamp; identifying a controlled vocabulary of job skills; extract standardized skills from the set of job postings based on the controlled vocabulary of job skills; calculating a percent of jobs having each of the job skills across each of a plurality of years; and generating a smooth trend function based on the percent of jobs having each of the job skills across the plurality of years.

Some embodiments may include identifying profile information for a job candidate. Some embodiments may include generating a salary prediction based on the profile information and the job skill taxonomy. Some embodiments may include identifying profile information for a job candidate. Some embodiments may include generating a career trajectory recommendation for the job candidate based on the profile information and the job skill taxonomy.

Some embodiments may include identifying profile information for a job candidate. Some embodiments may include identifying a plurality of job postings, wherein each of the plurality of job postings comprises a job description. Some embodiments may include scoring each of the plurality of job postings based on the profile information, the corresponding job description, and the job skill taxonomy. Some embodiments may include presenting one or more of the plurality of job postings to the job candidate based on the scoring.

Some embodiments may include identifying a job description for a job posting. Some embodiments may include identifying a plurality of candidate resumes. Some embodiments may include scoring each of the plurality of candidate resumes based on the job description and the job skill taxonomy. Some embodiments may include presenting one or more of the candidate resumes based on the scoring.

Some embodiments may include receiving a plurality of resumes from a job matching service, wherein the corpus of job description documents comprises the plurality of resumes. Some embodiments may include receiving a plurality of job descriptions from a job matching service, wherein the corpus of job description documents comprises the plurality of job descriptions. In some examples of the method, apparatus, and non-transitory computer readable medium described above, the job skill taxonomy or the semantic job skill network comprises a plurality of job skills, wherein each of the job skills is associated with a skill name, a skill description, and one or more related skills.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for classification of job skills, comprising:
identifying a set of job skill terms from a corpus of job description documents;
generating a synonym file by associating each of the job skill terms with a canonical job skill from a predetermined controlled vocabulary of job skills, wherein at least one canonical job skill is associated with a plurality of job skill terms;
extracting a set of job skills from the corpus of job description documents using the synonym file by identifying skill variants based on the synonym file, wrapping text tokens corresponding to the skill variants in a skill tag, removing non-skill terms, and standardizing the skill variants;
generating job skill relationship information including a parent-child relationship between a parent skill and a child skill based on the extracted set of job skills by performing latent semantic analysis (LSA) on the corpus of job description documents, wherein the job skill relationship information includes skill pairs sorted by a ranking score;

creating a job skill taxonomy based on the job skill relationship information, wherein the job skill taxonomy comprises a hierarchy of job skills including the parent skill and the child skill of the parent skill;

identifying profile information for a job candidate;

identifying the child skill as a missing skill for the job candidate based on the profile information and the parent child relationship; and generating a career trajectory recommendation for the job candidate including a recommendation to obtain the missing skill.

2. The method of claim 1, further comprising:
identifying profile information for a job candidate; and
generating a salary prediction based on the profile information and the job skill taxonomy.

3. The method of claim 1, further comprising: identifying one or more intermediate positions, wherein the career trajectory recommendation includes a recommendation to seek a job related to the one or more intermediate positions.

4. The method of claim 1, further comprising:
identifying profile information for a job candidate;
identifying a plurality of job postings, wherein each of the plurality of job postings comprises a job description;
scoring each of the plurality of job postings based on the profile information, the corresponding job description, and the job skill taxonomy; and
presenting one or more of the plurality of job postings to the job candidate based on the scoring.

5. The method of claim 1, further comprising:
identifying a job description for a job posting;
identifying a plurality of candidate resumes;
scoring each of the plurality of candidate resumes based on the job description and the job skill taxonomy; and
presenting one or more of the candidate resumes based on the scoring.

6. The method of claim 1, further comprising:
receiving a plurality of resumes from a job matching service, wherein the corpus of job description documents comprises the plurality of resumes.

7. The method of claim 1, further comprising:
receiving a plurality of job descriptions from a job matching service, wherein the corpus of job description documents comprises the plurality of job descriptions.

8. The method of claim 1, wherein:
the job skill taxonomy comprises a plurality of job skills, wherein each of the job skills is associated with a skill name, a skill description, and one or more related skills.

9. A method for generating a controlled vocabulary of job skills, comprising:
identify a database of resumes, a set of job postings, or both;
extract raw skills from the set of resumes, the set of job postings, or both;
validate the extracted raw skills;
generate a controlled job skill vocabulary based on the validated raw skills;
identify relationship information including a parent-child relationship between a parent skill and a child skill among jobs based on the controlled job skill vocabulary by performing latent semantic analysis (LSA) on the corpus of job description documents, wherein the job skill relationship information includes skill pairs sorted by a ranking score;

creating a job skill taxonomy based on the relationship information, wherein the job skill taxonomy comprises a hierarchy of job skills including the parent skill and the child skill of the parent skill;

identifying profile information for a job candidate;

identifying the child skill as a missing skill for the job candidate based on the profile information and the parent child relationship; and generating a career trajectory recommendation for the job candidate including a recommendation to obtain the missing skill.

10. The method of claim 9, further comprising:
extract a set of standardized job skills from the set of resumes, the set of job postings, or both based on the controlled job skill vocabulary.

11. The method of claim 9, wherein:
the extracted raw skills are validated using an automated algorithm, human validation, or both.

12. The method of claim 9, wherein:
the extracted raw skills are validated based at least in part on manual review, vetting and validation by human domain experts.

13. The method of claim 9, further comprising:
extract standardized skills from the set of job postings based on the controlled vocabulary of job skills;
calculate a percent of jobs having each of the job skills across each of a plurality of years; and
generate a smooth trend function based on the percent of jobs having each of the job skills across the plurality of years.

14. A method for classifying job skills, comprising:
identify a set of job postings, a set of job applications, or a text description database;
identify a controlled vocabulary of job skills based on the job postings, the job applications, or the text description database;
generating a synonym file by associating each of the job skill terms with a canonical job skill from the controlled vocabulary of job skills, wherein at least one canonical job skill is associated with a plurality of job skill terms;
extract standardized skills from the job postings, the job applications, or the text description database based on the controlled vocabulary of job skills by identifying skill variants based on the synonym file, wrapping text tokens corresponding to the skill variants in a skill tag, removing non-skill terms, and standardizing the skill variants;
train a machine learning model to extract job skill relationship information including a parent-child relationship between a parent skill and a child skill based on the extracted standardized skills;
create a semantic job skill network based on the machine learning model;
create a job skill taxonomy using the semantic job skill network, wherein the job skill taxonomy comprises a hierarchy of job skills including the parent skill and the child skill of the parent skill;
identify profile information for a job candidate;
identify the child skill as a missing skill for the job candidate based on the profile information and the parent child relationship; and generate a career trajectory recommendation for the job candidate including a recommendation to obtain the missing skill.

15. The method of claim 14, the code further comprising instructions executable by the processor to:
identify profile information for a job candidate; and
generate a salary prediction or a career trajectory recommendation for the job candidate based on the profile information and the semantic job skill network.

16. The method of claim 14, wherein:
the semantic job skill network comprises a plurality of job skills, wherein each of the job skills is associated with a skill name, a skill description, and one or more related skills.

17. The method of claim 14, the processor being further configured to execute the instructions to:
score each of the set of job postings based on the profile information, the corresponding job description, and the semantic job skill network; and
present one or more of the set of job postings to the job candidate based on the scoring.

18. The method of claim 14, the processor being further configured to execute the instructions to:
identify a job description for a job posting;
identify a plurality of candidate resumes;
score each of the plurality of candidate resumes based on the job description and the semantic job skill network; and
present one or more of the candidate resumes based on the scoring.

* * * * *